United States Patent [19]

Fan

[11] Patent Number: 5,952,090

[45] Date of Patent: Sep. 14, 1999

[54] ARTIFICIAL SPONGE WITH LIQUID BALLS THEREIN

[76] Inventor: Hung-Long Fan, No. 59-3, Lane 136, Si-De Rd., Wu-Fong village, Taichung Hsien, Taiwan

[21] Appl. No.: 09/137,299

[22] Filed: Aug. 21, 1998

[51] Int. Cl.⁶ .................................. B32B 3/26; B32B 3/06
[52] U.S. Cl. ..................................... 428/321.5; 428/306.6; 521/54
[58] Field of Search .............................. 428/306.6, 321.5; 521/54

[56] References Cited

U.S. PATENT DOCUMENTS 5,030,492   7/1991   Kurtin .................................. 428/321.5
5,677,049   10/1997   Toril .................................. 428/321.5

*Primary Examiner*—Morton Foelak
*Attorney, Agent, or Firm*—Bacon & Thomas, PLLC

[57] ABSTRACT

An artificial sponge includes a sponge body and at least one crushable liquid ball, the sponge body being made of open-cell foamed material having at least one receiving chamber, the at least one crushable liquid ball being respectively nested within the at least one receiving chamber inside the sponge body, each liquid ball having a thin, flexible enclosed membrane shell and a liquid filled in the shell, the least one liquid ball being respectively broken for letting the contained liquid to flow to the outside and to mix with water sucked in the sponge body when the sponge body is squeezed with the hand.

10 Claims, 5 Drawing Sheets

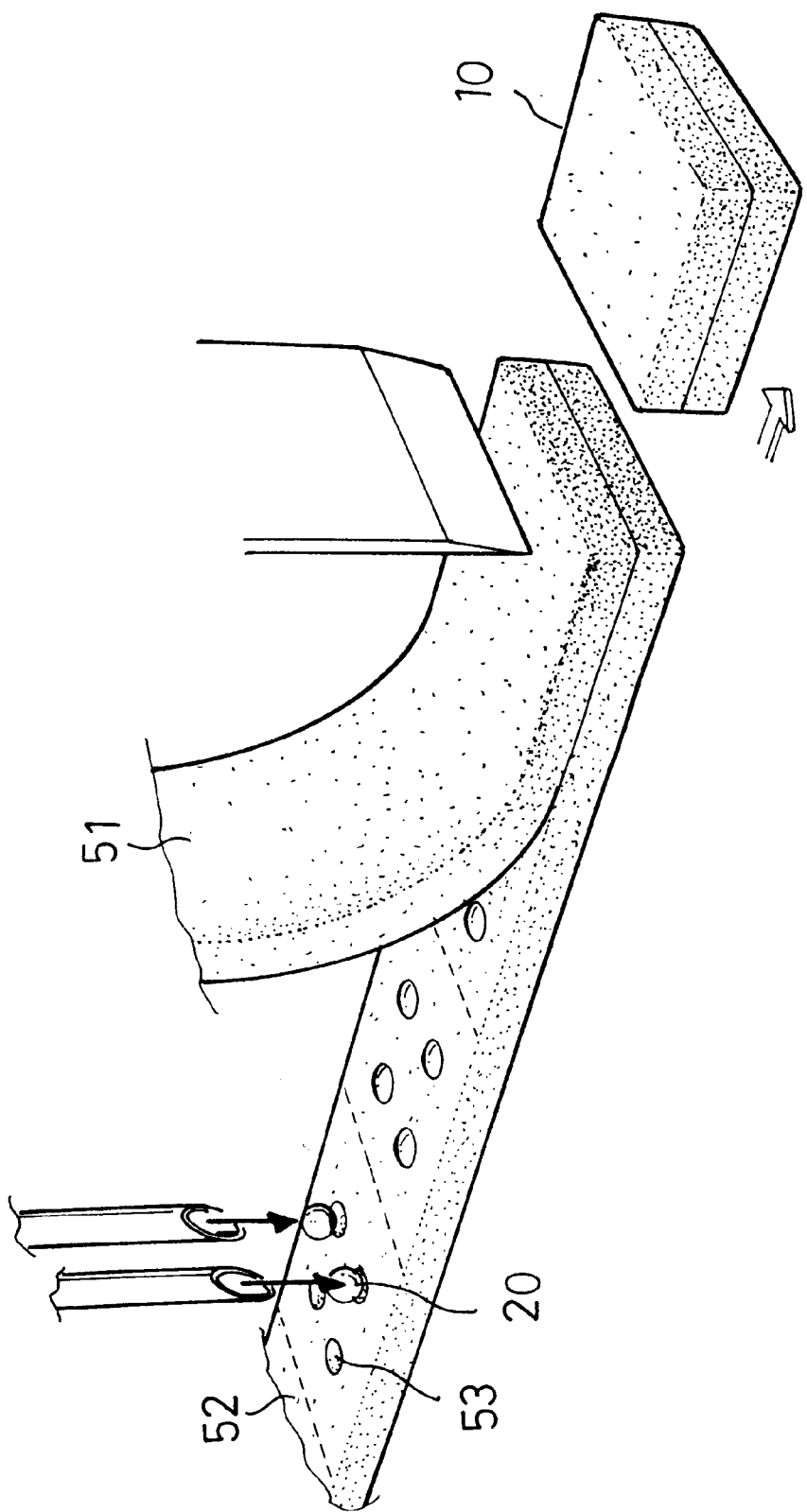

ARTIFICIAL SPONGE WITH LIQUID BALLS THEREIN

BACKGROUND OF THE INVENTION

The present invention relates to an artificial sponge which has crushable liquid balls in it, and more particularly to such an artificial sponge that can be used for cleaning the body, or applying a liquid substance to the body.

A variety of body lotion, bath gel, anti-radiation oil and skin-care oil may be used when taking a shower or bath in hotel, or going to swim in a swimming pool or sea bath. It is inconvenient to carry a variety of body lotion, bath gel, anti-radiation oil, skin-care oil, etc., when going outdoors. When bathing, one may use an artificial sponge (see FIG. 8, which is comprised of a sponge body 90 covered with a fabric covering 91) to apply a soap or body cleaning liquid to the body. When a soap is wet after an use, it may dirt the container. The container of a body cleaning liquid has occupies much storage space when carried in a bag or the like when going outdoors. Further, when applying an anti-radiation oil to the body with the hand, residual oil makes the hand feel uncomfortable.

SUMMARY OF THE INVENTION

The present invention has been accomplished to provide an artificial sponge which eliminates the aforesaid problems. It is one object of the present invention to provide an artificial sponge suitable which has crushable liquid balls in it, that can easily be broken by squeezing the sponge body with the hand anytime. It is another object of the present invention to provide an artificial sponge which is disposable, and suitable for sale by a vending machine. It is still another object of the present invention to provide an artificial sponge which is suitable for mass production to reduce the manufacturing cost.

According to the present invention, the artificial sponge is comprised of a sponge body, and at least one liquid ball. The sponge body is made of open-cell type foamed plastics, having a shape convenient for gripping with the hand, and at least one receiving chamber. The at least one liquid ball is respectively received in the at least one receiving chamber. Each liquid ball comprises a thin, flexible enclosed membrane shell, and a liquid filled in the enclosed shell. The liquid can be a body lotion, bath gel or the like for cleaning the body. Alternatively, the liquid can be anti-radiation oil, skin-care lotion, aromatic oil, refined oil obtained from Chinese medicine for application to the skin. When the sponge body is squeezed with the hand, the liquid balls are crushed, causing the liquid to flow out and to mix with water sucked in the sponge body. After an use, the used artificial sponge can be thrown away. The sponge body can be formed of two halves sealed together by welding, ultrasonic sealing, gluing or any other suitable sealing method. The at least one liquid ball is respectively retained in between the halves of the sponge body. The sponge body can have a spherical shape or any of a variety of shapes convenient for gripping with the hand. The outside wall of the sponge body may be embossed or wrinkles to provide an uneven surface for positively rubbing against the use's skin. In order for mass production, the sponge body can be made of two continuous sponge strips arranged in a stack. The sponge strips each have set of recessed holes at an inner side. When liquid balls are respectively put in the recessed holes between the sponge strips, the sponge strips are sealed together by welding, ultrasonic sealing, gluing, or any suitable bonding method. When sealed, the sponge strips are cut into pieces subject to the desired size. The liquid balls can be made individually, or be integral along an elongated string or thin sheet of a flexible membrane in equally spaced. A fabric covering may be covered on the sponge body for positive gripping with the hand. The sponge body is compressed with the hand, then put into the meshed fabric covering. After installation, the both ends of the meshed fabric covering is closed by for example a respective label. A hanging loop may be provided at one end of the fabric covering for hanging on the user's fingers. According to the aforesaid arrangement, a cleaning liquid or skin-care liquid is directly contained in crushable liquid balls mounted in a sponge body. When the sponge body is squeezed with the hand, the liquid balls are crushed, and the contained liquid immediately flow to the outside for application. Because the artificial sponge is suitable for mass production, its manufacturing cost is low.

BRIEF DESCRIPTION OF THE DRAWINGS

FIG. 3 shows the fabrication of an artificial sponge according to the present invention.

DETAILED DESCRIPTION OF THE PREFERRED EMBODIMENTS

Figure 2:
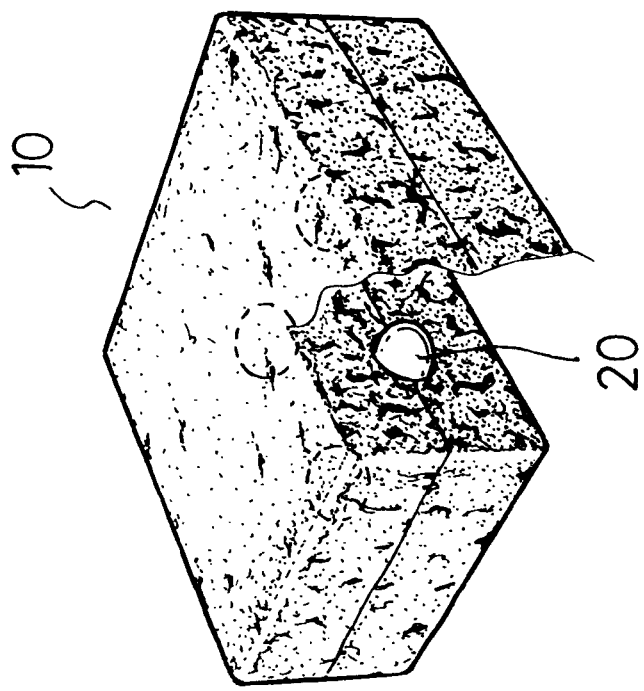
FIG. 2 is a cutaway of the artificial sponge shown in FIG. 1.
Figure 1:
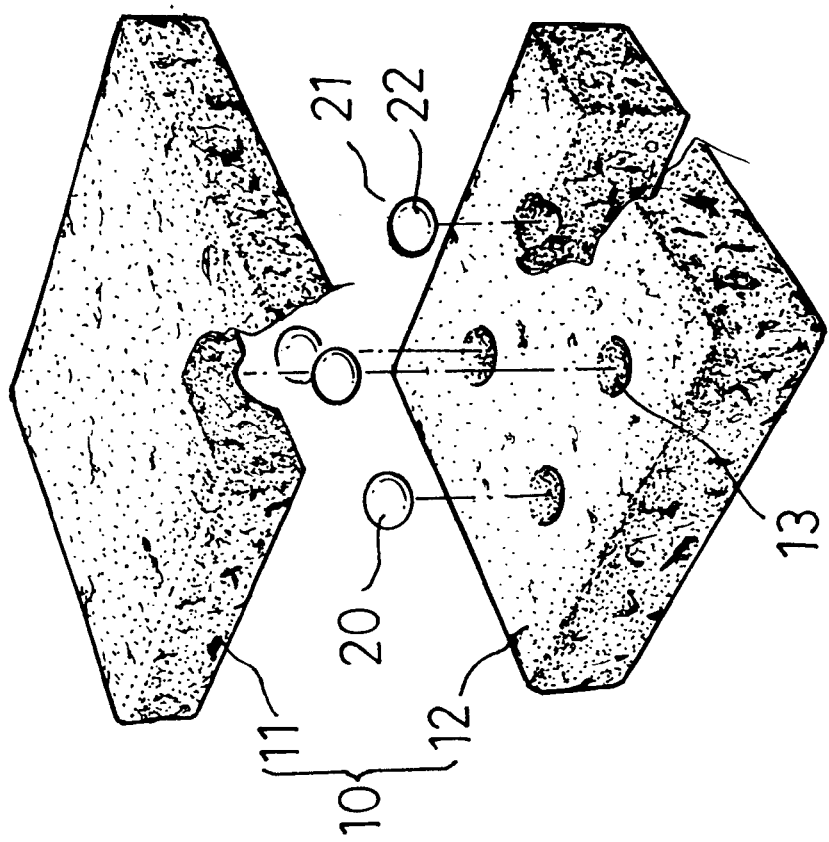
FIG. 1 is an exploded view of an artificial sponge according to one embodiment of the present invention.

Referring to FIGS. 1 and 2, an artificial sponge in accordance with one embodiment of the present invention is shown comprised of a sponge body 10, and four liquid balls 20. The sponge body 10 is comprised of two halves 11,12 made of open-cell type foamed plastics. The sponge body 10 has a substantially rectangular shape convenient for gripping with the hand. The halves 11,12 each have four recessed holes 13 at an inner side. The liquid balls 20 are received in the recessed holes 13 between the halves 11,12. Each liquid ball 20 comprises a flexible enclosed membrane shell 21, and a liquid 22 filled in the enclosed shell 21. The enclosed membrane shell 21 is molded from thermoplastic material of low structural strength. When the liquid balls 22 are respectively put in the recessed holes 13 between the halves 11,12, the two halves 11,12 are sealed together by a glue.

When the sponge body 10 is squeezed with the hand, the liquid balls 20 are crushed respectively, causing the liquid 22 to flow out and to mix with water sucked in the sponge body 10. The liquid 22 can be a body lotion, bath gel or the like for cleaning the body. Alternatively, the liquid 22 can be anti-radiation oil, skin-care lotion, aromatic oil, refined oil obtained from Chinese medicine for application to the skin.

Referring to FIG. 3, in order for mass production, the sponge body 10 can be made of two sponge strips 51,52 arranged in a stack. The sponge strips 51,52 each have set of recessed holes 53 at an inner side. When liquid balls 20 are respectively put in the recessed holes 53 between the sponge strips 51,52, the sponge strips 51,52 are sealed together by welding, ultrasonic sealing, gluing, or any suitable bonding method. When sealed, the sponge strips 51,52 are cut into pieces subject to the desired size.

Figure 4:
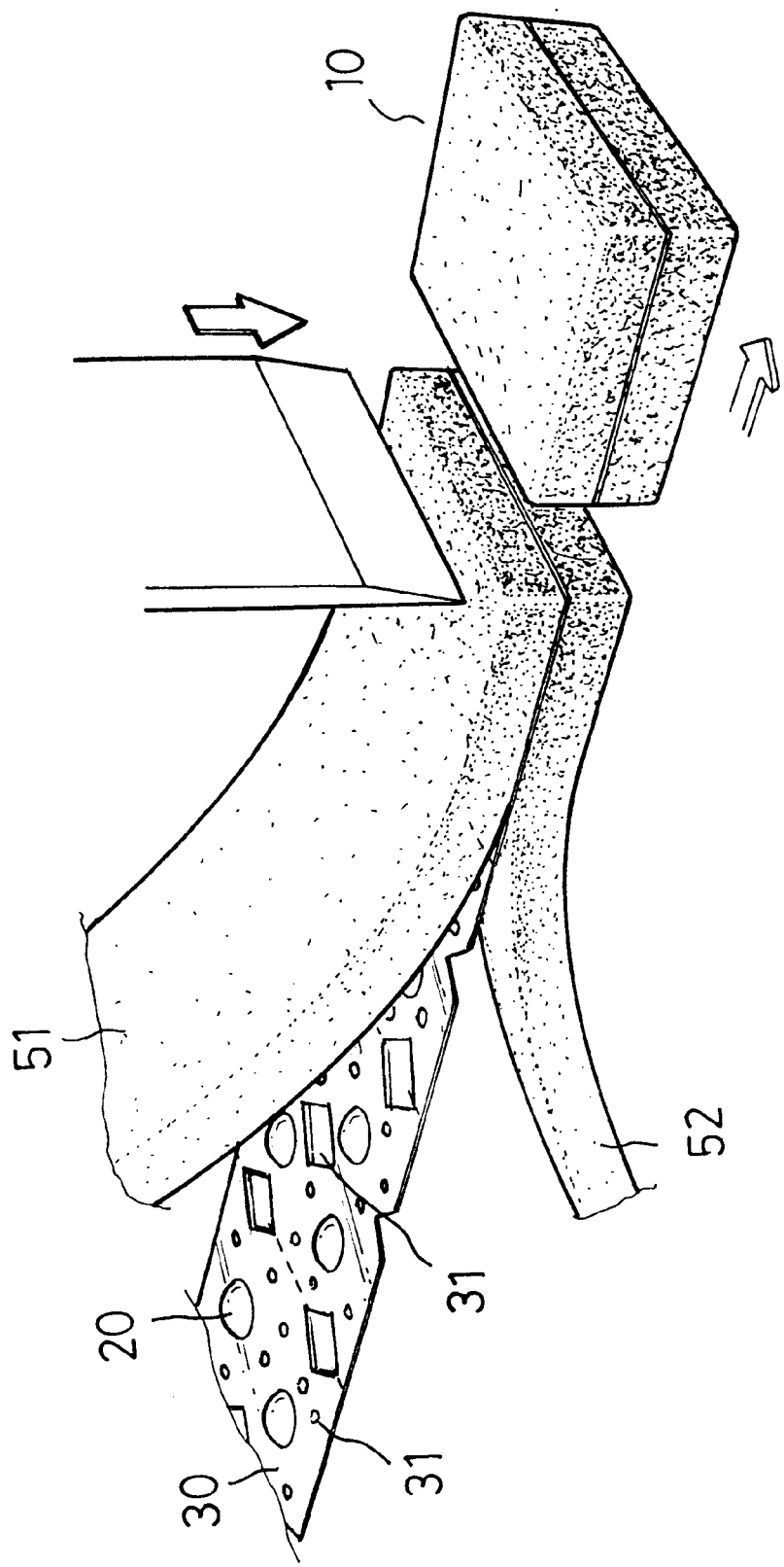
FIG. 4 shows the fabrication of an alternate form of the artificial sponge according to the present invention.

Referring to FIG. 4, liquid balls 20 are integral with a thin sheet of flexible membrane 30, which has a plurality of openings 31. The thin sheet of flexible membrane 30 is formed of two symmetrical layers arranged together and filled with liquid and then sealed together, which causes the liquid balls to be formed in it and be sealed in between the sponge strips 51,52. In this case, water can flow through the openings without any limitation.

Figure 5:
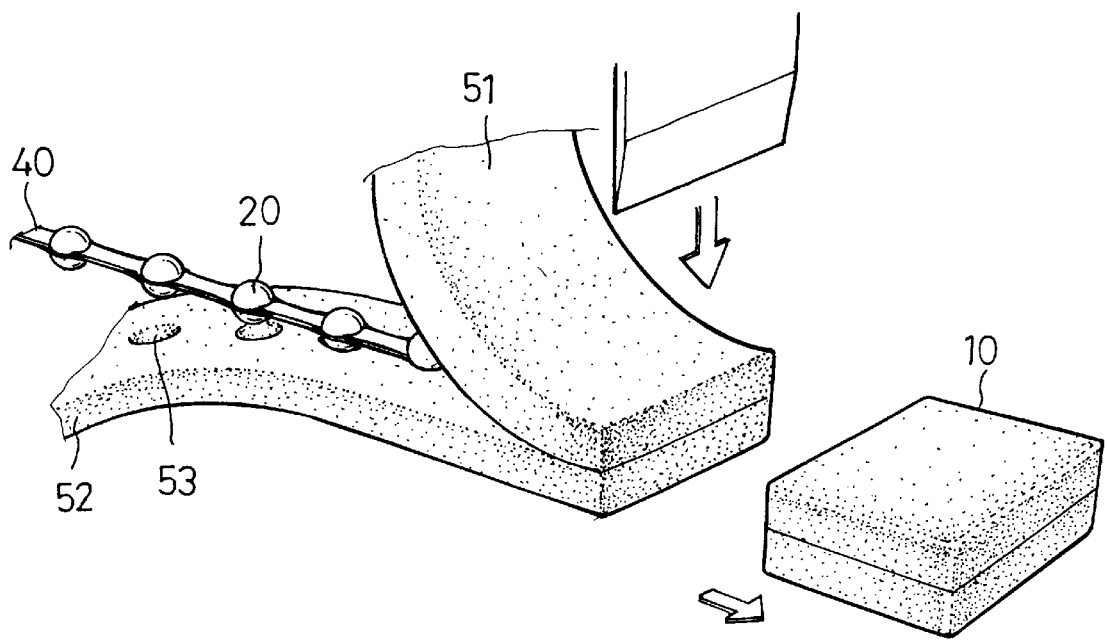
FIG. 5 shows the fabrication of another alternate form of the artificial sponge according to the present invention.

Referring to FIG. 5, liquid balls 20 are integral along an elongated string 40 in equally spaced, and retained in respective recessed holes 53 between the sponge strips 51,52.

Figure 6:
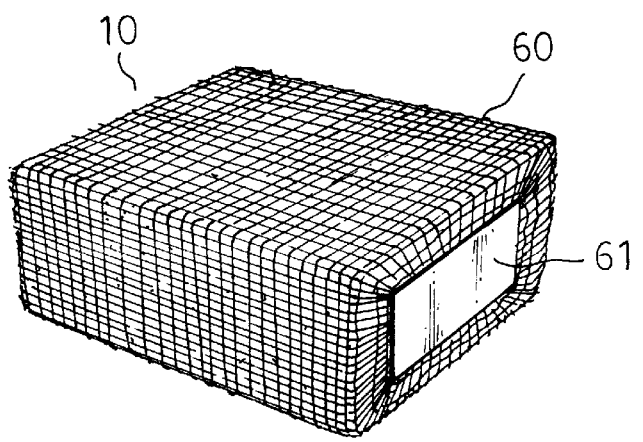
FIG. 6 shows the artificial sponge covered within a fabric covering according to the present invention.

Referring to FIG. 6, the sponge body 10 is covered within a meshed fabric covering 60. The meshed fabric covering 60 has cylindrical shape. The sponge body 10 is compressed with the hand, then put into the meshed fabric covering 60. After installation, the both ends of the meshed fabric covering 60 is closed by for example a respective label 61. The label 61 is made of water proof material, and printed with information including product specifications, content of the liquid 22, instruction for use, etc.

Figure 7:
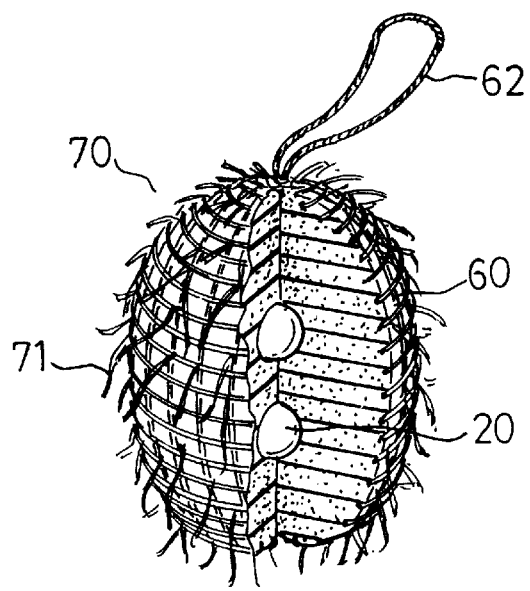
FIG. 7 is a cutaway of another alternate form of the present invention, showing artificial hairs raised from the peripheral of the spherical sponge body and a hanging loop formed at one end of the fabric covering.
Figure 8:
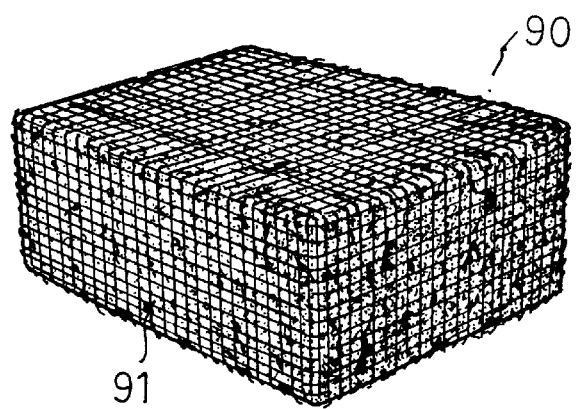
FIG. 8 shows an artificial sponge covered within a fabric covering according to the prior art.

Referring to FIG. 7, the sponge body 70 has a handy spherical shape covered within a meshed fabric covering 60. The sponge body 70 has artificial hairs 71 on the outside, which pass through open spaces in the meshed fabric covering 60 to the outside. The meshed fabric covering 60 has a loop 62 at one end for hanging. When in use, the loop 62 can be hung on the user's fingers or hook on the wall.

As indicated above, an artificial sponge in accordance with the present invention is comprised of a sponge body 10, and at least one liquid ball 20 set inside the sponge body 10. When the sponge body 10 is squeezed with the hand, the at least one liquid ball 20 is respectively crushed to let a liquid flow into open spaces in the sponge body 10 and mix with water in it for cleaning the body.

It is to be understood that the drawings are designed for purposes of illustration only, and are not intended as a definition of the limits and scope of the invention disclosed.

What the invention claimed is:

1. An artificial sponge comprising:
   a sponge body for gripping with the hand, said sponge body being made of open-cell type foamed material having at least one receiving chamber; and
   at least one liquid ball is respectively received within said at least one receiving chamber, said at least one liquid ball each comprising a thin, flexible enclosed membrane shell, and a liquid filled in said foamed plastic shell;
   when said at least one liquid ball is respectively broken it lets the contained liquid flow to the outside and to mix with water sucked in said sponge body when said sponge body is squeezed with the hand.

2. The artificial sponge of claim 1 wherein said sponge body is formed of two halves fastened together.

3. The artificial sponge of claim 1 wherein said at least one liquid ball is respectively integral with a thin sheet of flexible membrane.

4. The artificial sponge of claim 3 wherein said thin sheet of flexible membrane is formed of two symmetrical layers arranged together and filled with said liquid and then sealed together, causing said at least one liquid ball to be formed in it, said thin sheet of flexible membrane having openings around said at least one liquid ball.

5. The artificial sponge of claim 1 wherein said at least one liquid ball is respectively integral along an elongated string and equally spaced.

6. The artificial sponge of claim 1 wherein said sponge body is covered with a fabric covering.

7. The artificial sponge of claim 6 wherein said fabric covering has a hanging loop at one end.

8. The artificial sponge of claim 1 wherein said sponge body has a spherical shape.

9. The artificial sponge of claim 1 wherein said sponge body has artificial hairs raised from the periphery.

10. The artificial sponge of claim 1 wherein said membrane shell is molded from thermoplastic material of low strength.

\* \* \* \* \*